J. PLUĆINSKY, J. NOVOBILSKIE AND P. DZIGA.
HORN LOCK.
APPLICATION FILED MAY 21, 1919.
1,320,171.
Patented Oct. 28, 1919.
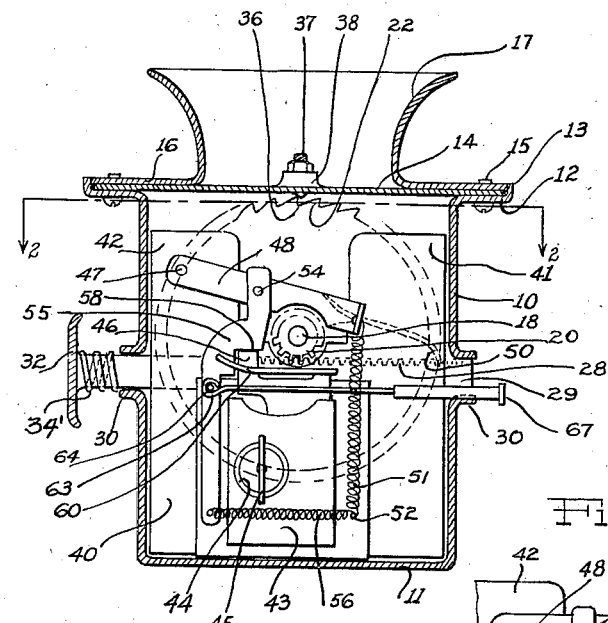
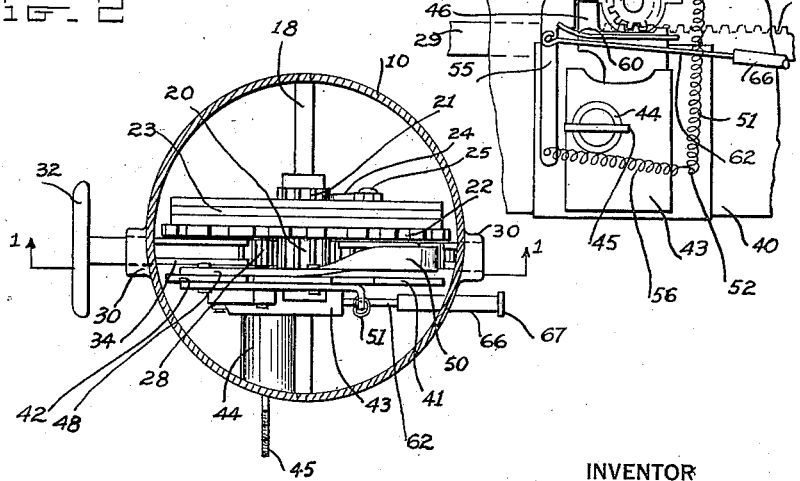
INVENTOR
Jimy Plucinsky
Joseph Novobilskie
Peter Dziga
BY
Alfred Tschinkel
ATTORNEY

UNITED STATES PATENT OFFICE.

JIMY PLUČINSKY, JOSEPH NOVOBILSKIE, AND PETER DZIGA, OF PASSAIC, NEW JERSEY.

HORN-LOCK.

1,320,171. Specification of Letters Patent. Patented Oct. 28, 1919.

Application filed May 21, 1919. Serial No. 298,733.

*To all whom it may concern:*

Be it known that I, JIMY PLUČINSKY, a citizen of Hungary, and I, JOSEPH NOVOBILSKIE, a citizen of the United States, and I, PETER DZIGA, a citizen of Austria, all residing at Passaic, county of Passaic, and State of New Jersey, have invented certain new and useful Improvements in Horn-Locks, of which the following is a specification.

This invention relates to improvements in signal horns, such as are used in connection with automobiles and like vehicles to indicate their approach.

The principal object of the invention is to provide a locking means whereby the horn may be prevented from operating at undesirable times.

This and other like objects are attained by the novel construction and combination of parts hereinafter described and shown in the accompanying drawings, forming a material part of this disclosure, and in which—

Figure 1 is a vertical sectional view taken through a conventional type of automobile horn and indicating the application of the invention.

Fig. 2 is a transverse or horizontal sectional view taken on line 2—2 of Fig. 1, and Fig. 3 is a fragmentary interior view, similar to Fig. 1, but showing the parts in another position.

Referring to the drawings, the automobile horn is comprised of a cylindrical casing 10, formed with a bottom 11, and having an outwardly flanged edge element 12, turned upward at the top 13, in which is secured a diaphragm 14, by a plurality of bolts 15 which also hold in engagement the flanged portion 16 of the horn mouth 17.

Rotatably mounted transversely in the casing 10 is a shaft 18 on which is rigidly engaged a spur pinion 20 and spaced therefrom is a ratchet 21, while rotatably mounted upon the shaft 18, between the pinion and ratchet, is a relatively large toothed wheel 22 having secured at its side a plurality of disks 23, the same acting as a fly wheel, and are actuated by a pawl 24 engaged in the teeth of ratchet 21, the pawl being pivoted on the pin 25 to the outer disk.

Motion is transmitted to the pinion 20 by means of a rack 28, formed upon a rectangular bar 29, extending through projections 30, formed with the casing, the rack bar being provided with an actuating head or knob 32, and guided internally of the casing in the track-way 34, it being normally projected outwardly by a coiled spring 34' (not shown).

The teeth of the wheel 22 are adapted to make contact with the point 36 of a screw 37 adjustably secured in a hub 38 formed with the diaphragm 14, which is thus caused to emit a loud and raucous sound at the passage of each tooth.

The several elements herein described constitute the essential parts of an automobile horn and are not to be considered as a part of the present invention.

The invention does consist however, in attaching interiorly of the cylinder casing 10 a plate 40, having raised projections 41 and 42, and attached to this plate is an ordinary tubular lock 43, its tubular extension 44 extending through an opening suitably formed in the casing 10 so as to receive the key 45 by which the lock is operated, the lock having an extensible bolt 46 of the usual type.

Pivoted on the pin 47, set in the plate extension 42, is a lever 48, its front portion being twisted and turned outwardly forming a detent 50, engageable with the teeth 28 of the rack so that when in contact therewith the bar is held against operation, the lever being drawn normally down, due to the pull of a coiled tension spring 51, its lower end being engaged with a pin 52, fixed in the plate 40.

Pivoted on the lever 48, by the pin 54 is a pendant lever 55, having an offset portion drawn normally toward the center of the casing due to the pull of a coiled tension spring 56, engaged at its opposite end with the pin 52. In its upper portion, is a seat 58 adapted to make contact with the bolt 46 of the lock when the same is in an outward position, thereby raising the detent 50 from engagement with the rack, allowing it to slide in the ordinary manner.

The pendant lever 55 is partially guided by a bent plate guard 60 which also acts as a guide for a wire rod 62, formed with an eye 63, encircling a pin 64, fixed in the side of the lever 55 and provided at its opposite, outer end with a plunger 66, extending through the casing 10 and having an enlarged actuating head 67, by which it may be pressed into the casing, thereby moving the lever 55 out of engagement with the bolt 46 and permitting the detent 50 to engage with the rack teeth, preventing the horn from being operated until a key has actuated the lock.

From the foregoing it will be seen that an effective device has been disclosed, for preventing the unauthorized actuation of a horn or signal of the type described, so that if the vehicle be left unattended, the horn can not be sounded until the lock has been actuated.

Having thus described our invention and set forth the manner of its construction, application and use, what we claim as new, and desire to secure by Letters Patent, is—

1. In a horn lock, the combination with a horn adapted to be actuated by the movement of a rack, and a lock fixed in the casing of said horn, of levers pivoted in said casing adapted to be raised when the bolt of said lock is extended, a detent carried by one of said levers, and means for normally drawing said detent into engagement with said rack, whereby it is prevented from movement.

2. In an automobile horn, the combination with a cylindrical casing, a horn mechanism contained therewithin, said mechanism including a rack transversely slidable in said casing, of a lever pivoted in said casing, a detent formed with said lever engageable with said rack whereby it is prevented from operation, a pendant lever pivoted on the first named lever, a key actuated lock secured in said casing, the bolt of said lock being contactable with said pendant lever whereby the detent is raised out of engagement with the teeth of said rack, and means for releasing said levers so as to cause engagement of the detent with said rack, said means extending outward through said casing.

3. In an automobile lock, the combination with a cylindrical casing, a diaphragm secured thereto, a toothed wheel engageable with said diaphragm, and a rack for actuating said toothed wheel, of a lock secured in said casing, said lock having an extensible bolt, a horizontal lever pivoted in said casing, a detent formed with the free end of said lever engageable with the teeth of said rack, a pendant lever pivoted on the first named lever, said pendant lever having a part engageable by the bolt of said lock, a spring holding said detent normally in engagement with the teeth of said rack, and a plunger adapted to free said pendant lever from the first named lever whereby the detent is caused to engage with the teeth of the rack, when said bolt is in an extended position.

In testimony whereof we have affixed our signatures.

JIMY PLUČINSKY.
JOSEPH NOVOBILSKIE.
PETER DZIGA.